United States Patent [19]
Ohara

[11] Patent Number: 5,724,452
[45] Date of Patent: Mar. 3, 1998

[54] QUANTIZATION ESTIMATING METHOD FOR DATA COMPRESSION QUANTIZATION ESTIMATING CIRCUIT OF DATA COMPRESSING APPARATUS

[75] Inventor: Kazutake Ohara, Osaka, Japan

[73] Assignee: Matsushita Electric Industrial Co., Ltd., Osaka, Japan

[21] Appl. No.: 421,846

[22] Filed: Apr. 13, 1995

[30] Foreign Application Priority Data

Apr. 13, 1994 [JP] Japan ................. 6-075120

[51] Int. Cl.⁶ ......................................... G06K 9/36
[52] U.S. Cl. ............................ 382/251; 382/250
[58] Field of Search ........................ 382/250, 251, 382/253; 348/405; 358/432, 433

[56] References Cited

U.S. PATENT DOCUMENTS

| | | | |
|---|---|---|---|
| 5,073,821 | 12/1991 | Juri | 358/133 |
| 5,150,208 | 9/1992 | Otaka et al. | 348/420 |
| 5,355,167 | 10/1994 | Juri | 348/405 |
| 5,404,168 | 4/1995 | Yamada et al. | 348/405 |
| 5,422,736 | 6/1995 | Katayama | 348/405 |
| 5,530,478 | 6/1996 | Sasaki et al. | 348/405 |
| 5,543,844 | 8/1996 | Mita et al. | 348/405 |

FOREIGN PATENT DOCUMENTS

| | | |
|---|---|---|
| 0 481 768 | 4/1992 | European Pat. Off. . |
| 0 554 871 | 8/1993 | European Pat. Off. . |
| 0 582 819 | 2/1994 | European Pat. Off. . |
| 4-91587 | 3/1992 | Japan . |
| 5-22711 | 1/1993 | Japan . |

OTHER PUBLICATIONS

Patent Abstracts of Japan, vol. 17, No. 307 (E-1379) Jun. 11, 1993.

*Primary Examiner*—Yon J. Couso
*Attorney, Agent, or Firm*—McDermott, Will & Emery

[57] ABSTRACT

A quantization estimating method for data compression comprises: a first step of making a calculation of code length for each DCT period per quantizer; a second step of successively executing, per quantizer, cumulative operations of the code lengths for the small blocks which consist of a plurality of DCTs and determining a quantizer to be commonly used for the large block which consists of N small blocks in the range where no overflow takes place; a third step of executing an operation of total code length at the time when the quantization level of the quantizer determined at the second step is replaced, per small block, with a higher quantization level, and determining, for each small block, each optimum quantizer which can be used in the range where no overflow takes place; and a fourth step of selecting each optimum quantizer for each small block.

18 Claims, 13 Drawing Sheets

Fig. 3

CUM. AD. OF C.L. IN FROM OF STAIRS (SQ MEMORY)

|  | (0) | (1) | (2) | (3) | (4) |
|---|---|---|---|---|---|
| Q1 | A10 | A11 | A12 | A13 | A14 |
| Q2 | A20 | A21 | A22 | A23 | A24 |
| Q3 | A30 | A31 | A32 | A33 | A34 |
| Q4 | A40 | A41 | A42 | A43 | A44 |
| Q5 | A50 | A51 | A52 | A53 | A54 |

O.F. IS NOT DETECTED ←
O.F. IS DETECTED →

$A_{i0} = l_{i0} + l_{i1} + l_{i2}$ $A_{i1} = l_{i0} + l_{i1} + l_{i2} + l_{i3} + l_{i4} + \underline{l_{i5}}$ $A_{i2} = l_{i0} + l_{i1} + l_{i2} + l_{i3} + l_{i4} + l_{i5} + l_{i6} + l_{i7} + \underline{l_{i8}}$ $A_{i3} = l_{i0} + l_{i1} + l_{i2} + l_{i3} + l_{i4} + l_{i5} + l_{i6} + l_{i7} + l_{i8} + l_{i9} + l_{ia} + \underline{l_{ib}}$ $A_{i4} = l_{i0} + l_{i1} + l_{i2} + l_{i3} + l_{i4} + l_{i5} + l_{i6} + l_{i7} + l_{i8} + l_{i9} + l_{ia} + l_{ib} + l_{ic} + l_{id} + \underline{l_{ie}}$

Fig.5

DETERMINING QUANT. FOR MACRO BLOCK

| MACRO BLOCK 0 | (0)(1)(2) | Q4 | A34 + A40 − A30 |
| --- | --- | --- | --- |
| MACRO BLOCK 1 | (3)(4)(5) | Q4 | A34 + A41 − A31 |
| MACRO BLOCK 2 | (6)(7)(8) | Q3 | A34 + A42 − A32 |
| MACRO BLOCK 3 | (9)(10)(11) | Q3 | A34 + A43 − A33 |
| MACRO BLOCK 4 | (12)(13)(14) | Q3 | |

← O.F. IS NOT DETECTED | O.F. IS DETECTED →

QUANTIZATION ESTIMATING METHOD FOR DATA COMPRESSION QUANTIZATION ESTIMATING CIRCUIT OF DATA COMPRESSING APPARATUS

BACKGROUND OF THE INVENTION

The present invention relates to a high-density, low-power consumption and high-speed quantization estimating circuit of a data compression apparatus suitable for an integrated circuit, and more particularly to a measure of restraining data from being lowered in quality at the time of data compression.

A recent digitalization of an image signal has increased the importance of a data compression technology for encoding data such as image signals or the like, causing the same to be compressed such that the signals are increased in density.

For example, when processing an image, a DC component is susceptible to an influence of quantization distortion since the DC component is an average value and therefore has a much greater amplitude as compared with other transform coefficients. To avoid such a quantization distortion, the DC component is required to be quantized in a considerably fine manner. More specifically, a quantization distortion of a DC component produces a level variation of a block in its entirety and such a level variation becomes prominent as a block distortion. On the other hand, an AC component is liable to have a great amplitude when the AC component is relatively low in degree, and a higher-degree transform coefficient often has a value of zero or a value near to zero. Accordingly, the quantization steps are made fine at lower degrees and coarse at higher degrees, thereby to reduce the number of bits to be given, thus reducing the information in quantity. Even though a complicated image undergoes a somewhat great change, such a change is not noticeable. However, when a simple image undergoes a change, such a change is noticeable even though very small. It is therefore not required to make uniform the quantization levels for all the data. More specifically, both maintenance of the quality of image data and a decrease in data size can be compatible with each other by increasing and decreasing the quantization level as necessary.

In view of the foregoing, a data compressing apparatus used for an image processing in a DVC (digital video cassette recorder) is arranged such that a DC component is not quantized but is recorded as it is, but an AC component is divided into four areas 0 to 3 as shown in FIG. 12 and the step width for quantization is changed according to the component value in an area. Further, the data compressing apparatus for a DVC is generally arranged such that, based on a concept of macro blocks and macro block slices each comprising five macro blocks, data for five macro blocks are jammed as compressed in a certain common code length.

On the other hand, there is known, as a data compressing apparatus used for a DVC, apparatus as disclosed in Japanese Patent Laid-Open Publication No. H5-227711 in which, to improve the image quality, the quantization level is raised for each macro block with respect to the quantization level commonly used for a macro block slice. As shown in FIG. 13, this data compressing apparatus comprises, as a quantization estimating circuit: an operator 100 connected to the output side of an orthogonal transform circuit (not shown); a data amount memory 101 for storing the results of cumulative addition calculations made by the operator 100; a subtracter 102 connected to the output side of the operator 100; a block difference memory unit 104 comprising first and second block difference memories 104a, 104b; a switch 103 for alternately switching the connection of the output terminal of the subtracter 102 to the first and second block difference memories 104a, 104b; a comparator 106 for comparing the amount of data stored in the data memory 101 with the transmissible data amount, such that an overflow is detected; an adder 107 for alternately cumulatively adding an output from the comparator 106 to an output from the block difference memory 104a and an output from the block difference memory 104b; a switch 105 for alternately supplying, to the adder 107, an input from the block difference memory 104a and an input from the block difference memory 104b; and a comparator 108 for comparing an output of the adder 107 with the transmissible data amount, such that an overflow is detected.

The following description will discuss the operation of the data compressing apparatus having the arrangement above-mentioned. Data of macro blocks in each macro block slice supplied from the orthogonal transformer, are successively entered into the operator 100. The operator 100 comprises 16 different types of quantizers and a table based on which there are obtained data amounts (code lengths) at the time when the outputs of the quantizers are subjected to variable-length encoding. In the operator 100, 16 different types of quantizations are carried out for each macro block, there are then obtained code lengths corresponding to the quantized values, the totals of such code lengths (16 different $D(i,j)$) are then obtained per quantizer, and the totals thus obtained are supplied to the subtracter 102. The operator 100 is arranged such that there are obtained 16 different totals $AD(i,j)$ of $D(i,j)$ for N macro blocks (N=the number of macro blocks in a macro block slice) per quantizer for each macro block slice, and these totals are supplied to and stored in the data amount memory 101. The subtracter 102 is arranged such that there is obtained, per macro block slice, a difference $S(i,j)$ $(=D(i+1, j)-D(i,j))$ between $D(i,j)$ corresponding to a quantizer i and $D(i+1,j)$ corresponding to a quantizer of which quantization No. is higher by one with respect to the quantizer i, and that the difference thus obtained is supplied to and stored in the block difference memory unit 104. In this example, N macro block slices are further divided into two groups, and such differences $S(i,j)$ for these two groups are stored in the first block difference memory 104a and the second block difference memory 104b, respectively.

After data estimation has been conducted with the operations above-mentioned, quantizer determination will then be made in the following manner.

The comparator 106 takes a data amount $AD(i,j)$ from the data amount memory 101 and detects the maximum $AD(i)$ which does not exceed the total transmissible data amount. In the adder 107, outputs from the comparator 106 are cumulatively added to outputs from the block difference memory unit 104. In the comparator 108, there is obtained, as the quantizer No., i which corresponds to $AD(i)$ which does not exceed the total transmissible data amount. With a value j renewed, $S(i,j)$ corresponding to this i are cumulatively added by the adder 107. There is renewed, by one, the quantization No. of the macro block corresponding to j until the result of cumulative addition exceeds the total transmissible data amount. More specifically, the comparator 108 checks whether or not the result of cumulative addition has exceeded a predetermined value (whether or not there is an overflow), and determines a quantizer based on the quantization No. immediately before the result of first cumulative addition circuit exceeds the predetermined value.

In the conventional quantization estimating circuit of a data compressing apparatus, the comparator 108 detects an overflow and determines the quantizing width within the range where no overflow occurs, such that the maximum data amount can be assured while restraining the amount of data to the extent that can be processed.

More specifically, even though a quantizer is determined for a macro block slice only and data are quantized using a quantizer determined per a micro block slice, the total transmissible data cannot effectively be utilized. That is, there is a considerable difference between the amount of data at the time when there is used a quantizer with which an overflow takes place, and the amount of data at the time when there is used a quantizer immediately before the quantizer with which an overflow takes place. Accordingly, the amount of data at the time when there is used the quantizer immediately before the quantizer with which an overflow takes place, is considerably small than the total transmissible data amount. Thus, there are instances where there is a considerable allowance in the total transmissible data amount, as shown in FIG. 11a.

On the other hand, according to the quantization estimating method as disclosed in the publication above-mentioned, quantizer determination is conducted for a small block. Accordingly, the allowance can effectively be reduced as shown in FIG. 11b. Thus, when this quantization estimating method is applied to a DVC or the like, it is possible to effectively restrain the occurrence of image distortion, yet increasing the recording density.

However, the quantization estimating method as disclosed in the publication above-mentioned is disadvantageous in view of an increase in the amount of operations to be conducted for determining each quantizer for each macro block. Further, according to the quantization estimating circuit as disclosed in the publication above-mentioned, it is required to dispose two data difference memories, causing the circuit to be increased in size.

SUMMARY OF THE INVENTION

It is an object of the present invention to provide, in quantization estimation in the course of determination of a quantizer in a data compressing apparatus, a system by which the intermediate and final results of cumulative operations are stored in the form of stairs and then utilized for determining an optimum quantizer, enabling such an optimum quantizer to be selected with no data difference memory disposed, such that the circuit size and power consumption can be reduced with the operations executed with a high speed.

To achieve the object above-mentioned, the present invention provides a quantization estimating method for data compression in which there are used M quantizers disposed in order of quantization level with the quantizer having the lowest quantization level disposed first, a plurality of data to be encoded are divided into small blocks and large blocks each comprising N small blocks, and each quantizer is determined and selected for each small block, this quantization estimating method comprising:

a first step of calculating each code length for each small block j (j=0 to N−1) per quantizer i (i=1 to M);

a second step of (i) executing, per quantizer i, cumulative operations of the code lengths respectively obtained for the small blocks j at the first step, the cumulative operations being successively executed in order of quantization level with the quantizer having the lowest quantization level first, (ii) executing an operation of total code length for the large block while storing, per small block j, the results of the cumulative operations of code length, as the intermediate results A (i, 0) to A (i, N−2) and final results A (i, N−1), the results being stored in the form of N stairs, and (iii) determining each quantizer to be commonly used for each large block within the range where no overflow takes place;

a third step of (i) executing, with the use of the cumulative operation results stored in the form of stairs, an operation of total code length at the time when the quantizer determined for each small block j at the second step is replaced with a quantizer having a higher quantization level, and (ii) determining, for each small block, the largest number of quantizers which can be replaced within the range where no overflow takes place; and a fourth step of selecting, for each small block, each optimum quantizer in the range where the total code length for the large block does not overflow.

According to the method above-mentioned; based on the code lengths for the small blocks obtained at the first step, at the second step, (i) there is executed a cumulative operation of total code length at the time when there is used a quantizer which is common for the small blocks of a large block, and (ii) there is determined a quantizer which can commonly be used for the small blocks in the range where no overflow takes place. At this time, there are stored, per each of N small blocks, the intermediate result of cumulative operation and the final result for the entire large block. More specifically, since the cumulative operation result of code length for the first small block is successively increased by an amount for one small block, the intermediate and final results of cumulative operations to be stored are made in the form of N stairs.

At the third step, with the use of the cumulative operation results stored in the form of stairs at the second step, there is executed an operation of total code length at the time when the quantization level is replaced with a quantization level higher than that of the quantizer determined at the second step. Then, there is determined, for each small block, each optimum quantizer in the range where no overflow takes place. Accordingly, the quantizer is replaced, for each of certain small blocks of a large block, with a quantizer having a quantization level higher than that for other small blocks, and the quantizer determined at the second step is used for each of other small blocks. Accordingly, there is filled, as much as possible, that vacant portion of a zone given for the total code length which is produced when the quantizer determined at the second step is commonly used for all the small blocks of a large block. This restrains the data to be compressed from being lowered in quality.

Further, all the cumulative operation results for the small blocks are stored for each quantizer. Accordingly, an operation of total code length can be executed merely by carrying out addition and/or subtraction with the use of the cumulative operation results stored in the form of stairs with no need of execution of cumulative operations one by one again. This not only improves the operation speed but also reduces the size of the circuits required for embodying this quantization estimating method.

In the quantization estimating method for data compression above-mentioned, at the second step, while holding the No. qi of a quantizer in which an overflow has taken place during the operation of total code length for the large block, there is preferably determined, as a quantizer which can commonly be used for the large block, a quantizer qi−1 of which quantization level is lower by one stage than that of the quantizer qi.

According to the method above-mentioned, at the second step, there is determined the quantizer qi−1 of which quantization level is lower by one stage than that of the quantizer qi where an overflow has been detected. Accordingly, there is further reduced that vacant portion of a zone given for the total code length which is produced when there is used a quantizer common for a large block.

The quantization estimating method for data compression is preferably arranged such that: at the third step, (i) there are successively executed operations of a difference A (qi, j)–A (qi–1, j) between the cumulative operation result A (qi, j) up to a small block J at the time when there is used a quantizer qi where an overflow has taken place, and the cumulative operation result A (qi–1, j) up to the small block j at the time when there is used a marginal quantizer qi–1 where no overflow takes place, (ii) there is executed, based on the sum of the difference A (qi, j)–A (qi–1, j) and the final cumulative operation result A (qi–1, N–1) in the marginal quantizer qi–1 where no overflow takes place, an operation of total code length at the time when the quantization level of the quantizer qi–1 for each small block J is replaced with a one-stage higher quantization level, (iii) there is held a small block qj where an overflow takes place for the first time, and (iv) there is determined a marginal small block qj–1 where no overflow takes place; and that at the fourth step, the quantizer qi is selected for small blocks 0 to qj–1 and the quantizer qi–1 is selected for small blocks qj to N–1.

According to the method above-mentioned, there is filled that vacant portion of a zone given for the total code length which is produced when there is used each quantizer for each large block determined at the second step. Thus, the data can be compressed in the most efficient manner.

In the quantization estimating method for data compression above-mentioned, the cumulative operations at the second step may be executed either by addition or by subtraction.

The quantization estimating method for data compression above-mentioned may be arranged such that, at the time of the cumulative operations at the second step, address control is executed such that a read address of the memory is delayed by a period of time corresponding to one DCT period when the small block changes with respect to a write address when storing, per small block j, the intermediate results A (i, 0) to A (i, N–2) and final results A (i, N–1) of the cumulative operations of code length, the results being stored in the form of N stairs.

According to the method above-mentioned, it is possible by a simple address control for memory alone, the intermediate result of cumulative operations for small blocks and the final result of cumulative operations for the large blocks, such results being stored in the form of stairs. This assures prompt control.

The quantization estimating method for data compression may be applied to data compression to be carried out for an image processing in a digital video cassette recorder formed based on a concept of macro blocks serving as the small blocks and macro block slices serving as the large blocks.

In such a case, the quantization estimating method is suitable for data compression in a DVC for which both high-speed operation and high-quality image are particularly required.

Further, the present invention provides a quantization estimating circuit for embodying the quantization estimating method for data compression, which circuit comprises:

M quantizers disposed in order of quantization level with the quantizer having the lowest quantization level first;

code-length calculating circuits each connected to each quantizer i (i=1 to M) for making a calculation of code length for each small block j (j=0 to N–1) per quantizer i;

a signal selecting circuit connected to each of the code-length calculating circuits for selecting and supplying one of signals of code lengths calculated by the codelength calculating circuits;

a first quantizer determining circuit for receiving that signal of code length for one DCT period when the small block changes which has been selected by the signal selecting circuit and for determining a quantizer having the highest quantization level which can commonly be used for the large block; and a second quantizer determining circuit for determining a small block for which there can be used a quantizer having a quantization level higher by one stage than the highest quantization level which can commonly be used for the large block and which has been determined by the first quantizer determining circuit;

the first quantizer determining circuit comprising:

first cumulative operation means connected to the signal selecting circuit for (i) successively executing, per quantizer i, cumulative operations of the code lengths calculated for the small blocks j by the codelength calculating circuit, such cumulative operations being executed in order of quantization level with the quantizer having the lowest quantization level first, and (ii) making a calculation of total code length for the large block;

memory means for storing, per small block j, the operation results obtained by the first cumulative operation means as the intermediate results A (i, 0) to A (i, N–2) and final results A (i, N–1) of cumulative operations of code lengths, the results being stored in the form of N stairs, first overflow detecting means connected to the first cumulative operation means for detecting the time when the total code length for the large block overflows; and first holding means connected to the first overflow detecting means for holding the number qi of a quantizer where an overflow has taken place;

the second quantizer determining circuit comprising:

difference calculating means connected to the memory means and the first holding means for calculating a difference A (qi, j)–A (qi–1, j) between the cumulative operation result A (qi, j) up to a small block j for a quantizer qi where an overflow has taken place, and the cumulative operation result A (qi–1, j) up to the small block j for a marginal quantizer qi–1 where no overflow takes place;

second cumulative operation means connected to the difference calculating means for executing, based on the sum of the difference A (qi, j)–A (qi–1, j) and the final cumulative operation result A (qi–1, N–1) for the marginal quantizer qi–1 where no overflow takes place, an operation of total code length at the time when the quantization level for each small block j is replaced with a quantization level higher by one stage than the quantization level of the quantizer qi–1;

second overflow detecting means connected to the second cumulative operation means for detecting the time when the total code length operated by the second cumulative operation means overflows; and second holding means connected to the second overflow detecting means for holding the number qj of a small block for which an overflow has taken place.

In the first and second cumulative operations means of the quantization estimating circuit of a data compressing apparatus above-mentioned, the cumulative operations may be executed either by an adder or by a subtracter. When an adder is used, an overflow is detected through a carry from the adder. When a subtracter is used, an overflow is detected through a borrow from the subtracter.

In the quantization estimating circuit of a data compressing apparatus, the first and second quantizer determining circuits may be incorporated in a single circuit.

In the quantization estimating circuit of a data compressing apparatus above-mentioned, each of the first and second holding means is formed by a register, the registers being incorporated, together with the first and second overflow detecting means, in a single circuit.

In the quantization estimating circuit of a data compressing apparatus, the data compressing apparatus is used for an image processing apparatus of a digital video cassette recorder formed based on a concept of macro blocks serving aS the small blocks and macro block slices serving as the large blocks.

The quantization estimating circuit of a data compressing apparatus may further comprise:

a memory control circuit connected to (i) the first overflow detecting means and the memory means of the first quantizer determining circuit, and (ii) the second overflow detecting means of the second quantizer determining circuit, the memory control circuit being arranged to control the address of the memory means, the memory control circuit being arranged such that, after there has been executed, in an operation of total code length by the first cumulative operation means, a cumulative operation of code length up to a small block, a read address of the memory means is delayed by a period of time corresponding to one DCT period with respect to a write address.

BRIEF DESCRIPTION OF THE DRAWINGS

FIG. 3 is a view illustrating the contents of the cumulative operation results stored, in the form of stairs, in the SQ memory;

FIG. 5 is a view illustrating an operation of quantizer determination by the second quantizer determining circuit according to the embodiment of the present invention;

DESCRIPTION OF PREFERRED EMBODIMENTS

The following description will discuss an embodiment of the present invention.

Figure 6:
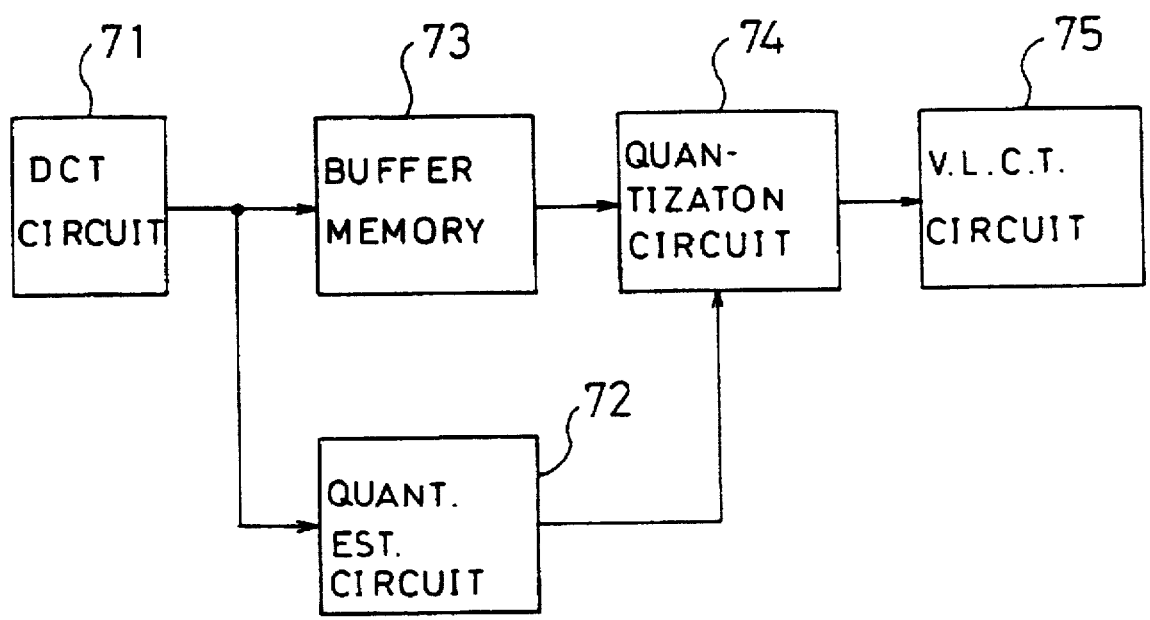
FIG. 6 is a block diagram of a schematic arrangement of an image data compressing apparatus according to the embodiment of the present invention.

FIG. 6 is a view illustrating the arrangement of an image data compressing apparatus of the feedforward control type. As shown in FIG. 6, the image data compressing apparatus comprises a discrete cosine transform circuit (hereinafter referred to as DCT circuit) 71, a buffer memory 73, a quantization circuit 74, a variable-length code transform circuit 75 and a quantization estimating circuit 72. More specifically, provision is made such that the DCT circuit 71 conducts a discrete cosine transform on the data, that the data thus subjected to a discrete cosine transform are then subjected to a variable length code transform per quantizer and the code lengths of the data thus subjected to a variable length code transform are then calculated by the quantization estimating circuit 72, that there is determined and selected a quantizer with which the code lengths thus calculated do not overflow, and that a signal representing the quantizer thus selected is supplied to the quantization circuit 74. At this time, the buffer memory 73 plays a role of delaying the transmission of data from the DCT circuit 71 to the quantization circuit 74 until the calculation by the quantization estimating circuit 72 has been finished. The quantization circuit 74 is arranged to quantize data stored in the buffer memory 73 into 5 different manners of 1, ½, ¼, . . . ¹⁄₁₆, and the variable length code transform circuit 75 is arranged to cause a quantized data to be subjected to a variable-length code transform. With the processings above-mentioned, image data are to be compressed.

Figure 7:
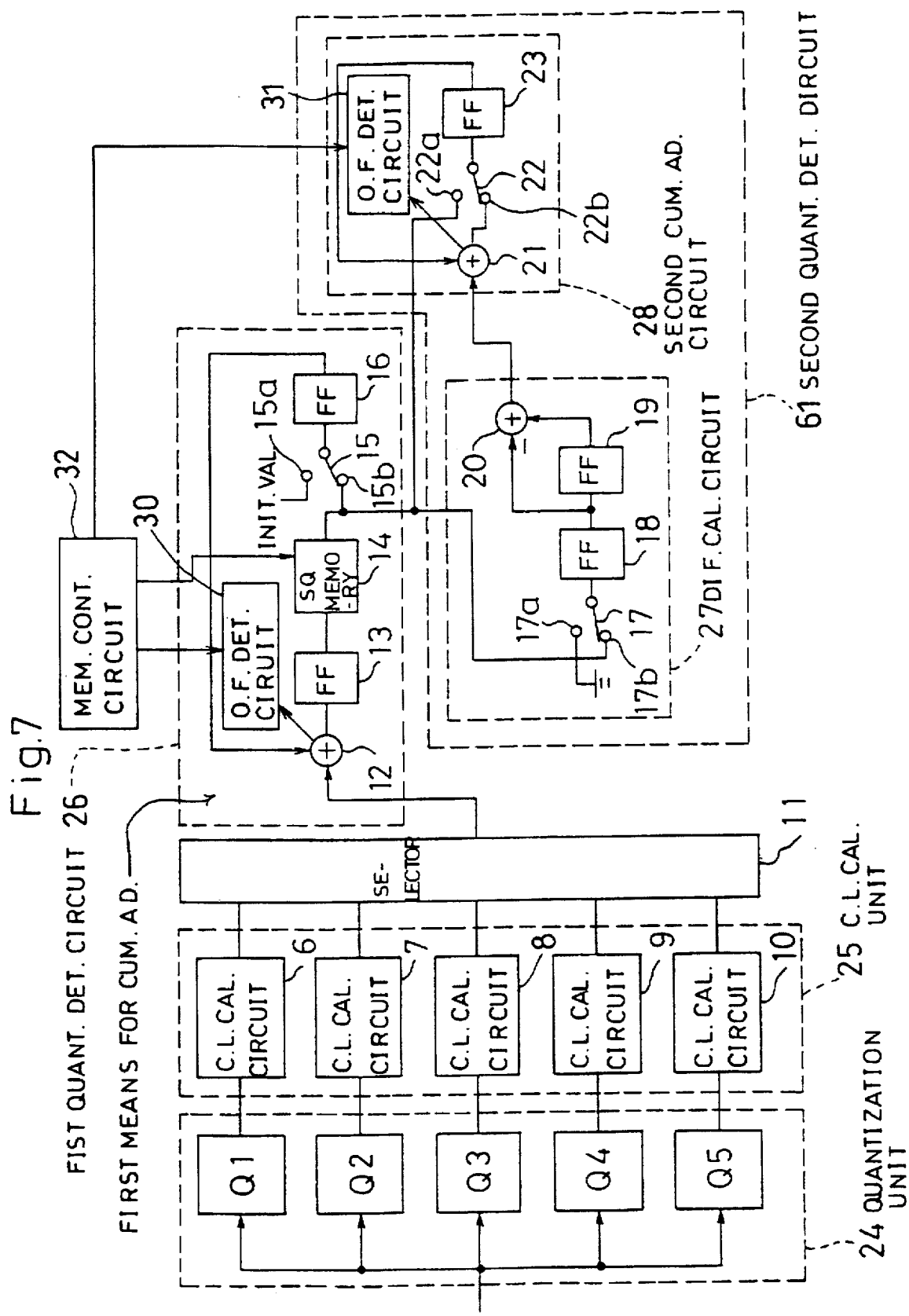
FIG. 7 is an electric circuit diagram of an example of the quantization estimating circuit as arranged to execute a cumulative operation with the use of an adder.

FIG. 7 shows an example of the inside arrangement of the quantization estimating circuit 72 in FIG. 6. As shown in FIG. 7, the quantization estimating circuit 72 comprises a quantization unit 24 including a plurality of quantizers Q1 to Q5, a code length calculating unit 25 including a plurality of code length calculating circuits 6 to 10 respectively connected to the output sides of the quantizers Q1 to Q5, a selector 11 connected to the output side of the code length calculating unit 25 and serving as signal selecting means for selecting one of outputs from the code length calculating circuits 6 to 10, a first quantizer determining circuit 26 for determining quantization for each macro block slice and a second quantizer determining circuit 61 for determining quantization for each macro block.

Disposed in the first quantizer determining circuit 26 are an adder 12 for conducting an addition calculation, flip-flops or latches 13, 16 and a SQ memory 14 for making, per quantizer, cumulative addition calculations of code length for one macro block slice and for storing, per quantizer, the intermediate and final results of cumulative addition calculations for N macro blocks contained in one macro block slice each time one macro block is increased. Provision is made such that, after the cumulative addition calculations have been finished, the SQ memory 14 in the first quantizer determining circuit 26 stores, in the form of N stairs, the results of cumulative addition per quantizer. Disposed at the output side of the SQ memory 14 are a switch 15 for switching the input thereof to an initial value setting circuit (not shown) (a terminal 15a) or the output terminal of the SQ memory 14 (a terminal 15b), and the flip-flop 16 serving as holding means for holding an output of the switch 15. An output of the flip-flop 16 serves as one input to be entered into the adder 12. Also disposed are a first overflow detecting circuit 30 for detecting a carry (overflow) of the adder 12, and a memory control circuit 32 for controlling the SQ memory 14. A first cumulative addition circuit serving as first cumulative operation means is formed by the switch the flip-flop 16 and the adder 12.

Disposed in the second quantizer determining circuit 61 are a difference calculating circuit 27 serving as difference calculating means for calculating a difference between macro blocks, and a second cumulative addition circuit 28 serving as second cumulative operation means for conducting a cumulative addition per macro block. The difference calculating circuit 27 has a switch 17 for switching the input thereof to the grounding (a terminal 17a) or the output side of the SQ memory 14 (a terminal 17b), two flip-flops 18, 19 connected in series to the output side of the switch 17 and a subtracter 20 for subtracting an output from the flip-flop 19 from an output from the flip-flop 18. The second cumulative addition circuit 28 comprises an adder 21 for making an addition calculation, a switch 22 for switching the input thereof to the output side of the SQ memory 14 (a terminal 22a) or the output side of the adder 21 (a terminal 22b), a flip-flop 23 and a second overflow detecting circuit 31 serving as second overflow detecting means for detecting a carry of the adder 21.

Disposed outside of the quantizer determining circuits 26, 61 is the memory control circuit 32 for controlling the operations of the overflow detecting circuits 30, 31 and the SQ memory 14.

Latches may be disposed instead of the flip-flops used in the embodiment above-mentioned.

The following description will schematically discuss a quantization estimating method according to the present invention.

Figure 1:
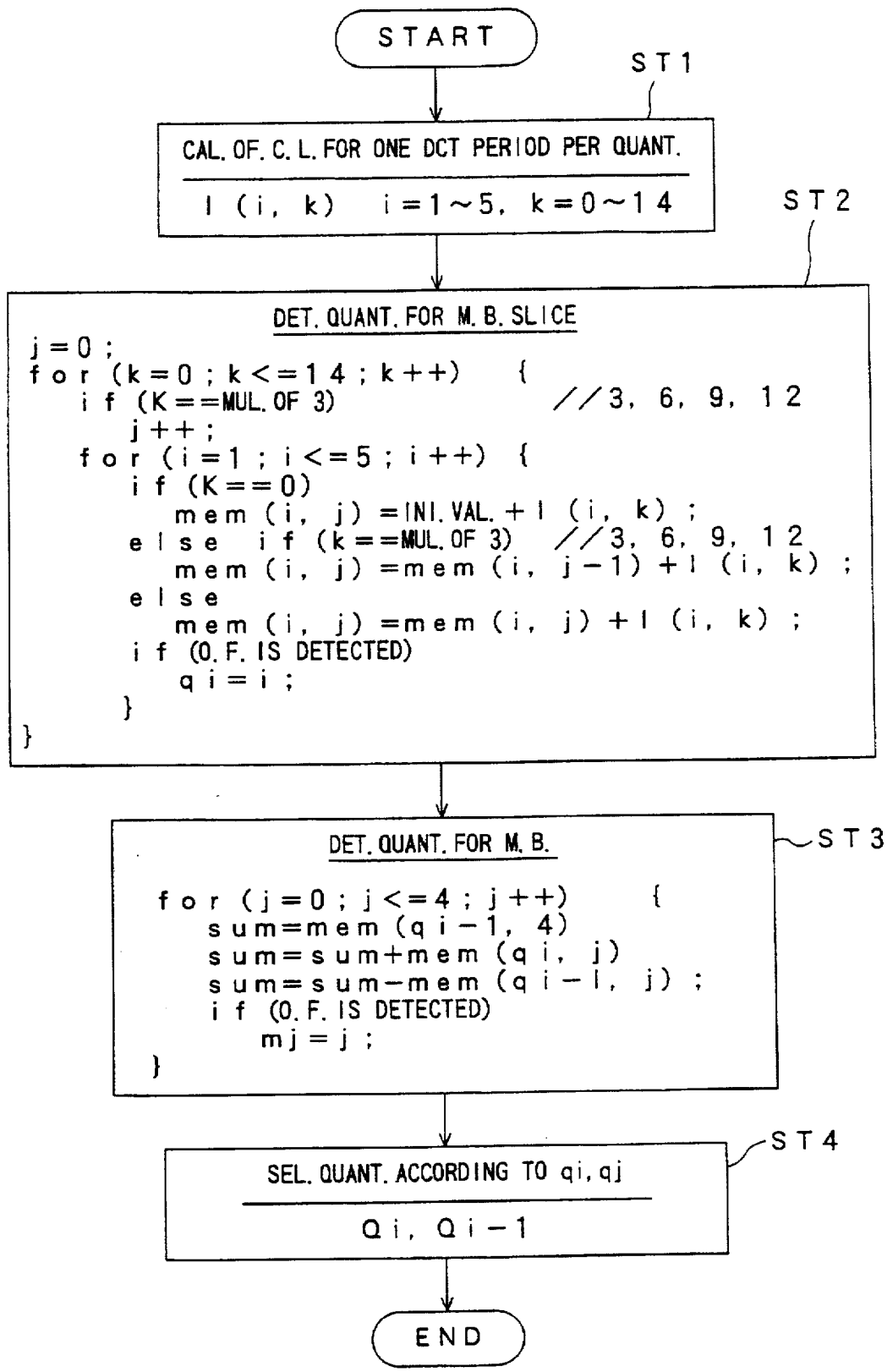
FIG. 1 is a flow chart of a quantization estimating method according to an embodiment of the present invention.
Figure 2:
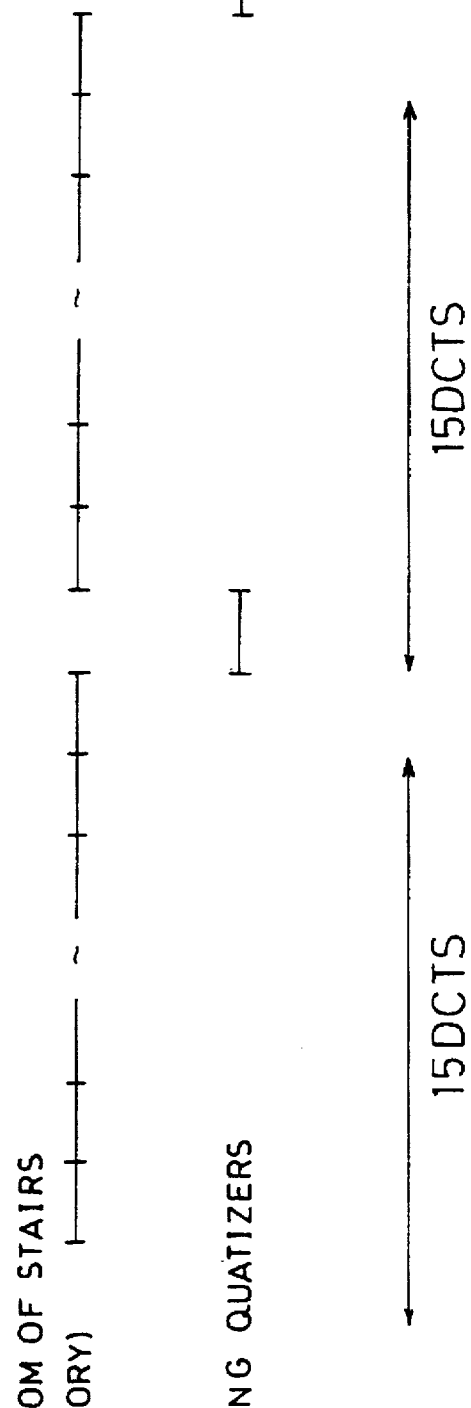
FIG. 2 is a view illustrating the operational timings of a quantization estimating circuit according to the embodiment of the present invention.

FIG. 1 is a flow chart illustrating the basic steps of the quantization estimating method of the present invention. FIG. 2 is a view illustrating the timings of the respective steps shown in FIG. 1. In this embodiment, the description will be made on an example in which a processing is executed with the use of five quantizers Q1 to Q5 with five macro blocks 0 to 4 serving as one macro block slice, wherein one macro block is consisted of three DCTs.

In FIG. 1, "i" is the number of the quantizer, "k" is the number of the DCT and "j" is the number of the macro block. At a step ST1, there is made a calculation of code length for one DCT period per quantizer. More specifically, when there are N quantizers, the N quantizers are disposed in parallel and there is executed an operation of total code length for one DCT period per quantizer, and then the total value thus operated is maintained for one DCT period. The calculation result to be maintained is set as 1 (i, k). In FIG. 2, however, there is simply stated, as "1 ik", the code length calculation result on the kth DCT out of the data of each quantizer Qi (i=1 to 5).

At a step ST2, there is executed a processing of determining a quantizer for a macro block slice (large block). More specifically, code lengths 1 ik are successively read from the quantizers per one DCT and subjected to a cumulative addition calculation, and the cumulative addition results are stored in mem(i,j) (memory). Such processings may successively be executed in series, and parallel processings are not required. In the cumulative addition calculations, the cumulative addition results are finally stored, in the form of stairs, in the mem(i,j). This is a characteristic of the quantization estimating method according to the present invention. Further, at the time of cumulative addition calculation, an overflow detection is conducted, and the number i of a quantizer in which an overflow has taken place is held, as qi=i, in a register of the overflow detecting circuit 30. That is, there is determined a quantizer qi to be commonly used for a macro block slice. As shown in FIG. 2 illustrating the operational timings, the stairs-like quantization calculation is made with one DCT delayed when the macro block changes with respect to a code length calculation.

At a step ST3, there is determined each quantizer for each macro block (small block). More specifically, based on the mem(i, j) and the number qi of the quantizer in which an overflow has taken place, the quantization level is replaced, for each macro block, with a one-stage higher level and there is made a cumulative addition calculation of code length. At this time, by utilizing the cumulative addition results stored in the form of stairs at the step ST2, this cumulative addition processing can be executed in a very simple processing (more specifically, with a difference calculation utilized). This is also a characteristic of the present invention. That is, as will be discussed in detail later, it is not required to again make cumulative addition calculations of code length per small block, one by one. At this time, likewise in the quantizer determining processing at the step ST2, an overflow of cumulative addition results is detected, and the number j of a macro block in which an overflow has taken place is stored, as qj=j, in a register. In the view of operational timings in FIG. 2, quantizer determination per DCT is conducted at one DCT after the quantization calculation has been finished.

At a step ST4, the final quantizer is selected according to the quantizers qi, qj determined at the steps ST2 and ST3.

The following description will discuss the specific processing contents of the steps of the basic flow chart in FIG. 1.

The contents of code-length calculation at the step ST1 in FIG. 1, are as shown in FIG. 2. At this time, in the quantization estimating circuit 72 shown in FIG. 7, data after subjected to a DCT are quantized by the quantizers Q1 to Q5 of the quantization unit 24. Then, the code length calculating circuits 6 to 10 of the code length calculating unit 25 make calculations of code lengths for the quantizers Q1 to Q5, and the calculation results are entered into the selector 11. In the selector 11, the code-length calculation results are selected in the order of outputs from the quantizers Q1, Q2, Q3, Q4, Q5 and supplied to the first quantizer determining circuit 26.

At the step ST2 in FIG. 1, there are made cumulative addition calculations of code length shown in FIG. 3. The contents of the memory in FIG. 3 show the state after a cumulative addition for one macro block slice has been conducted. More specifically, when conducting a cumulative addition for the first macro block, the data stored in the address A10 is used for the quantizer Q1, and the data stored in the address A20 is used for the quantizer Q2. The foregoing is also applied to other quantizers; that is, data stored in the addresses A30, A40, A50 are respectively used for the quantizers Q3, Q4, Q5. Next, when conducting a cumulative addition for the second macro block, the data stored in the address A11 is used for the quantizer Q1. This is also applied to other quantizers; that is, data stored in the addresses A21, A31, A41, A51 are respectively used for the quantizers Q2, Q3, Q4, Q5. The foregoing is also applied to each of the third, fourth and fifth macro blocks; that is, data stored in addresses Ai2, Ai3, Ai4 (i=3, 5) are respectively used. When the cumulative addition for the first macro block has been finished and the cumulative addition for the second macro block starts, the data read addresses before addition, are set to A10, A20, A30, A40, A50 and the data write addresses after addition, are set to A11, A21, A31, A41, A51. This means that the memory control circuit 32 changes the address control for the SQ memory 14 at the time when the sequence proceeds from the first macro block to the second macro block in repeat operations using the data of cumulative addition calculations. The address control made by the memory control circuit 32 is a mere control of delaying a memory read address by a period of time corresponding to one DCT period when the macro block changes with respect to a write address, and can therefore readily be achieved. This address control by the memory control circuit 32 is a significant characteristic of the present invention.

The equations shown in FIG. 3 at its lower portion show the contents of the data Ai0, Ai1, Ai2, Ai3, Ai4 of the addresses corresponding to the macro blocks 0 to 4 for the quantizer Qi. The memory data Ai0, Ai1, Ai2, Ai3, Ai4 are characterized in that they are increased in the form of stairs. The final results of cumulative addition calculations remain in the data A14, A24, A34, A44, A54 for the quantizers Q1 to Q5, respectively. When the quantizers are arranged in the order from Q1 to Q5 or from Q5 to Q1 according to the size of quantization, it is possible to find, with the use of an overflow detecting circuit, the marginal quantizer where no overflow takes place. An overflow is determined according to one macro block slice as a unit. In the example in FIG. 8, the quantizer Q3 presents maximum quantization with no overflow taken place, and the final result of cumulative addition at that time remains as the memory contents A84.

The respective component elements of the first quantizer determining circuit 26 shown in FIG. 7, are operated, in the following manner, according to those results of code-length calculation of the quantizers Q1 to Q5 which are supplied from the selector 11. First, the switch 15 is switched to the side of the terminal 15a such that the initial value is set to the flip-flop 16. This initial value is equal to a value obtained by subtracting, from the upper limit value of an overflow in the adder 12, a capacitance value of a buffer which stores the code. Then, the switch 15 is switched to the side of the terminal 15b such that the output side of the SQ memory 14 is connected to the input side of the flip-flop 16. In the adder 12, the data from the selector 11 are successively cumulatively added per each of the quantizers Q1 to Q5 of the quantization unit 24, and the intermediate addition results and the final addition results are stored in the SQ memory 14. The overflow detecting circuit 80 detects the time when a carry has taken place from the adder 12, such that an overflow of data is detected. Then, there is stored the No. of the quantizer at that time (Q3 shown in FIG. 3 in this embodiment).

Figure 4:
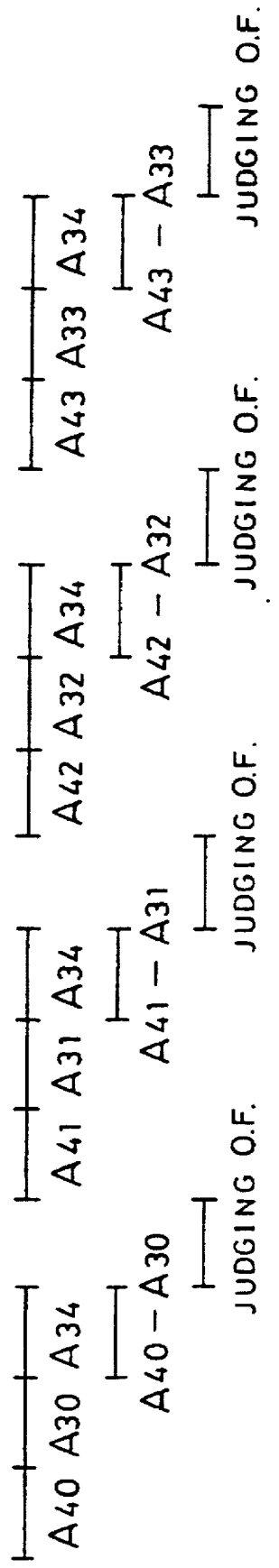
FIG. 4 is a view illustrating the operational timing of a second quantizer determining circuit according to the embodiment of the present invention.

Then, at the step ST3 in FIG. 1, each quantizer is determined for each small block (macro block) as shown in FIGS. 4 and 5. When it is supposed that there is set, as Qn, the quantizer of which quantization becomes maximum with no overflow taken place for one macro block slice, a quantizer Qi is successively replaced with a quantizer Qi+1 for each macro block and there is found a marginal macro block for which no overflow takes place.

FIG. 4 is a view illustrating the operational timings of quantizer determination for each small block. In the processing of determining each quantizer for each large block (macro block slice) at the step ST2, the No. of the quantizer where an overflow has been detected, was Q3. Accordingly, the No. of a quantizer is successively advanced by one for each of the macro blocks 0 to 4, and there is determined a limit at which the total value of code lengths to be cumulatively added at that time, overflows. More specifically, as shown in FIG. 4, with the use of the stairs-like data stored as the results of the cumulative addition operations at the step ST2, there are successively made calculations of A34+(A40−A30), A34+(A41−A31), . . . .

FIG. 5 is a view illustrating the relationship between overflow detection and the total code length at the time when successively advancing, from Q3 to Q4, the No. of a quantizer for the macro blocks 0 to 4. The following description will discuss, in a specific manner, the results of calculation of total code lengths.

To replace the quantizer Q8 with the quantizer Q4 for the first macro block (0), there is conducted a calculation of A34+(A40−A30).

Since the following equations are established:

$$A34 = 1\,30 + 1\,31 + 1\,32 + 1\,33 + 1\,34 + 1\,35 + 1\,36 + 1\,37 + 1\,38 + 1\,39 + 1\,3a + 1\,3b + 1\,3c + 1\,3d + 1\,3e$$
$$A40 = 1\,40 + 1\,41 + 1\,42$$
$$A30 = 1\,30 + 1\,31 + 1\,32,$$

the following equation is established:

$$A34 + (A40 - A30) = 1\,40 + 1\,41 + 1\,42 + 1\,33 + 1\,34 + 1\,35 + 1\,36 + 1\,37 + 1\,38 + 1\,39 + 1\,3a + 1\,3b + 1\,3c + 1\,3d + 1\,3e.$$

Accordingly, it is understood that this is equivalent to the replacement of the quantizer Q3 with the quantizer Q4 for the first macro block (0). Likewise, to replace the quantizer Q3 with the quantizer Q4 for the first and second macro blocks (0), (1), there is made a calculation of A34+(A41−A31).

Since the following equations are established:

$$A34 = 1\,30 + 1\,31 + 1\,32 + 1\,33 + 1\,34 + 1\,35 + 1\,36 + 1\,37 + 1\,38 + 1\,39 + 1\,3a + 1\,3b + 1\,3c + 1\,3d + 1\,3e$$
$$A41 = 1\,40 + 1\,41 + 1\,42 + 1\,43 + 1\,44 + 1\,45$$
$$A31 = 1\,30 + 1\,31 + 1\,32 + 1\,33 + 1\,34 + 1\,35$$

the following equation is established:

$$A34 + (A41 - A31) = 1\,40 + 1\,41 + 1\,42 + 1\,43 + 1\,44 + 1\,45 + 1\,36 + 1\,37 + 1\,38 + 1\,39 + 1\,3a + 1\,3b + 1\,3c + 1\,3d + 1\,3e.$$

Accordingly, it is understood that this is equivalent to the replacement of the quantizer Q3 with the quantizer Q4 for the first and second macro blocks (0), (1). Likewise, to replace the quantizer Q3 with the quantizer Q4 for the first, second and third macro blocks (0), (1), (2), there is made a calculation of A34+(A42−A32).

Since the following equations are established:

$$A34 = 1\,30 + 1\,31 + 1\,32 + 1\,33 + 1\,34 + 1\,35 + \\ 1\,36 + 1\,37 + 1\,38 + 1\,39 + 1\,3a + 1\,3b + \\ 1\,3c + 1\,3d + 1\,3e$$
$$A42 = 1\,40 + 1\,41 + 1\,42 + 1\,43 + 1\,44 + 1\,45 + \\ 1\,46 + 1\,47 + 1\,48$$
$$A32 = 1\,30 + 1\,31 + 1\,32 + 1\,33 + 1\,34 + 1\,35 + \\ 1\,36 + 1\,37 + 1\,38$$

the following equation is established:

$$A34 + (A42 - A32) = 1\,40 + 1\,41 + 1\,42 + 1\,43 + \\ 1\,44 + 1\,45 + 1\,46 + 1\,47 + 1\,48 + 1\,39 + \\ 1\,3a + 1\,3b + 1\,3c + 1\,3d + 1\,3e.$$

Accordingly, this is equivalent to the replacement of the quantizer Q3 with the quantizer Q4 for the first, second and third macro blocks (0), (1), (2). To replace the quantizer Q3 with the quantizer Q4 for the first, second, third and fourth macro blocks (0), (1), (2), (3), there is made a calculation of A34+(A43−A33).

Since the following equations are established:

$$A34 = 1\,30 + 1\,31 + 1\,32 + 1\,33 + 1\,34 + 1\,35 + \\ 1\,36 + 1\,37 + 1\,38 + 1\,39 + 1\,3a + 1\,3b + \\ 1\,3c + 1\,3d + 1\,3e$$
$$A43 = 1\,40 + 1\,41 + 1\,42 + 1\,43 + 1\,44 + 1\,45 + \\ 1\,46 + 1\,47 + 1\,48 + 1\,49 + 1\,4a + 1\,4b$$
$$A33 = 1\,30 + 1\,31 + 1\,32 + 1\,33 + 1\,34 + 1\,35 + \\ 1\,36 + 1\,37 + 1\,38 + 1\,3a + 1\,3b$$

the following equation is established:

$$A34 + (A43 - A33) = 1\,40 + 1\,41 + 1\,42 + 1\,43 + \\ 1\,44 + 1\,45 + 1\,46 + 1\,47 + 1\,48 + 1\,49 + \\ 1\,4a + 1\,4b + 1\,3c + 1\,3d + 1\,3e.$$

Accordingly, this is equivalent to the replacement of the quantizer Q3 with the quantizer Q4 for the fourth macro block (3).

After all, according to the quantization estimating method above-mentioned, a quantizer Qi−1 is replaced with a quantizer Qi for one macro block in four cycles. When one macro block slice comprises five macro blocks, there is a possibility of a quantizer Qi for four macro blocks being replaced with a quantizer Qi+1. Thus, quantizer determination can be conducted in max. 4×4=16 cycles.

At this time, in the first quantizer determining circuit 26 in the quantization estimating circuit 72 in FIG. 7, the address control made by the memory control circuit 32 causes the cumulative addition result data to be read out from the SQ memory 14, and there is obtained, by the difference calculating circuit 27 and the second cumulative addition circuit 28, the cumulative addition result of code lengths at the time when a quantizer Qi−1 is replaced with a quantizer Qi for each macro block. In the difference calculating circuit 27, the switch 17 is switched to the side of the terminal 17b at a cycle of quantizer determination, and the output terminal of the SQ memory 14 is connected to the input terminal of the flip-flop 18. When the switch 22 of the cumulative addition circuit 28 is switched to the side of the terminal 22a, the data from the SQ memory 14 is set to the flip-flop 23. Thereafter, when the switch 22 is switched to the side of the terminal 22b, the output side of the adder 21 is connected to the input side of the flip-flop 23, and the data stored in the SQ memory 14 is added to the output data of the difference calculating circuit 27. Then, the second overflow detecting circuit 31 detects a carry taken place in the adder 21 such that whether an overflow is present or absent is judged.

To calculate A34+(A40−A30) for example, data A40, A30, A34 are read out from the SQ memory 14 in this order, a calculation of (A40−A30) is made at the timing where A84 is latched in the flip-flop 23. By adding the result of (A30−A40) to an output from the flip-flop a calculation of A34+(A40−A30) can be made. Accordingly, it is not required to conduct again cumulative additions one by one when executing a cumulative operation for determining each quantizer to be used for each small block.

Figure 10A:
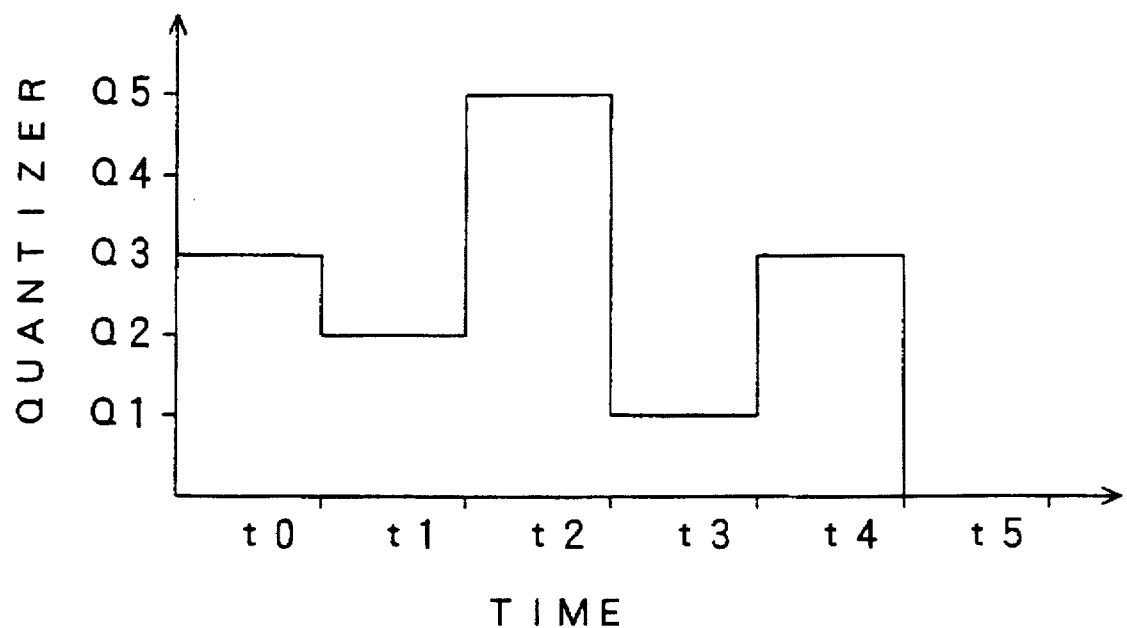
FIG. 10a is a view illustrating a change, with the passage of time, in quantization level at the time when a common quantizer is used for a large block.
Figure 10B:
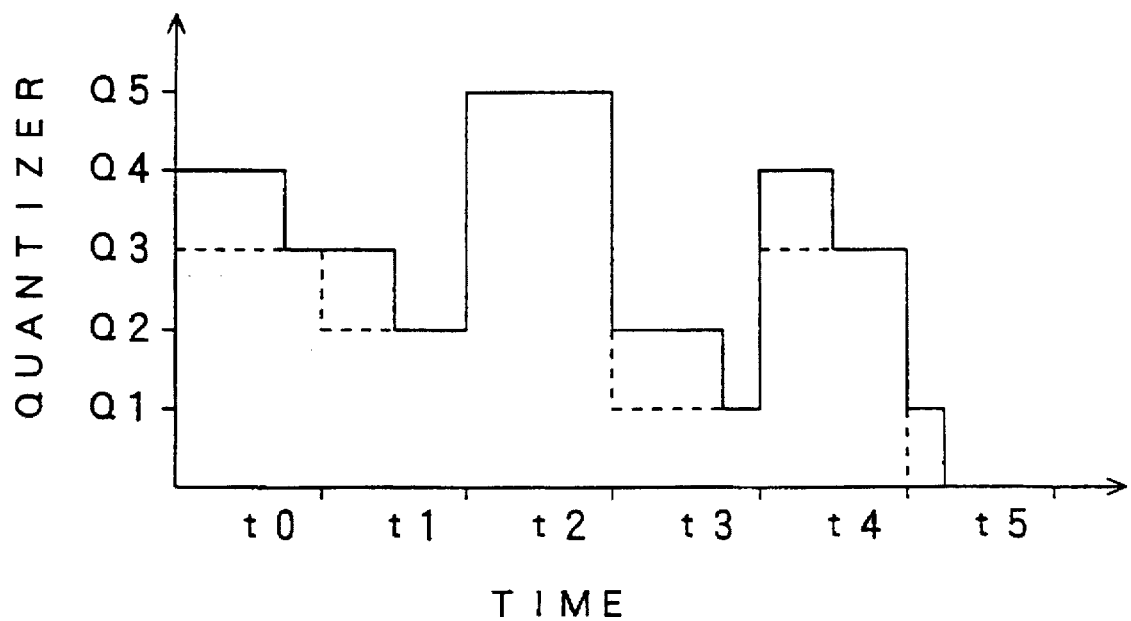
FIG. 10b is a view illustrating a change, with the passage of time, in quantization level at the time when there is used a quantizer determined for a small block according to the embodiment of the present invention.
Figure 11A:
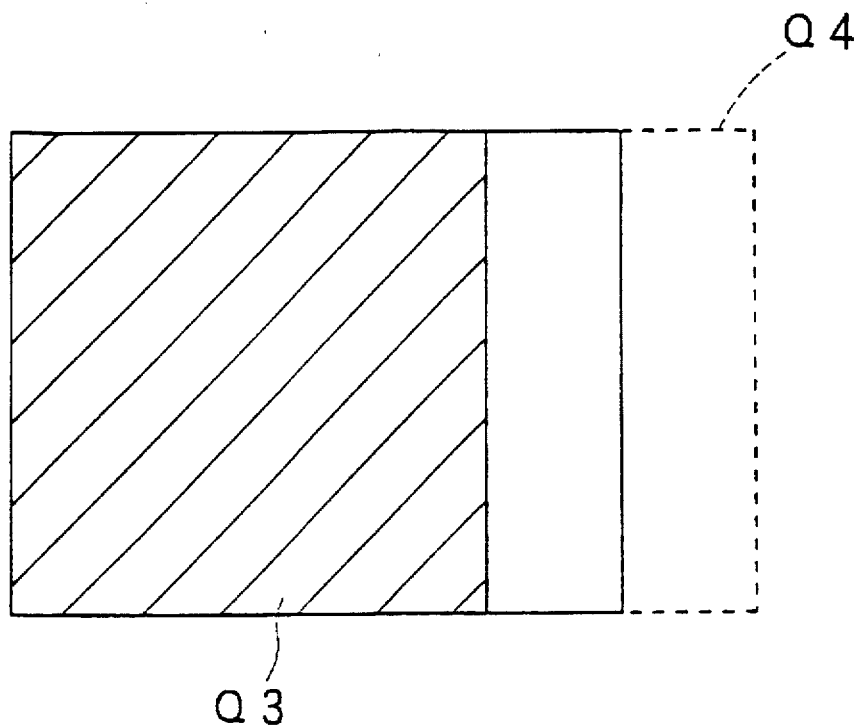
FIG. 11a is a view illustrating a vacant portion of a fixed zone at the time when a common quantizer is used for a macro block.
Figure 11B:
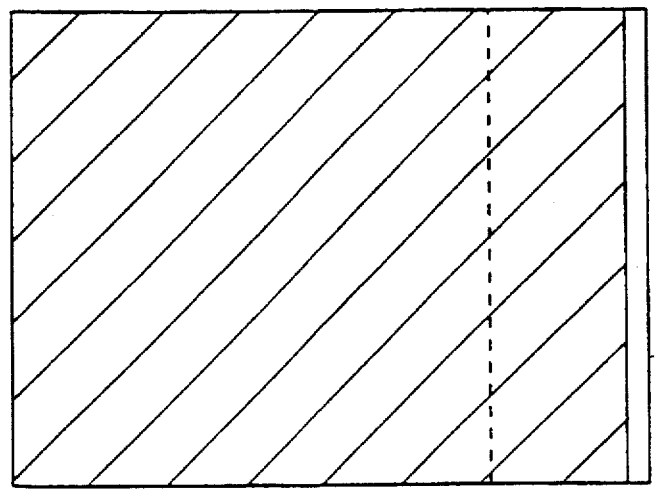
FIG. 11b is a view illustrating a vacant portion of a fixed zone at the time when there is used a quantizer determined for a small block according to the embodiment of the present invention.
Figure 12:
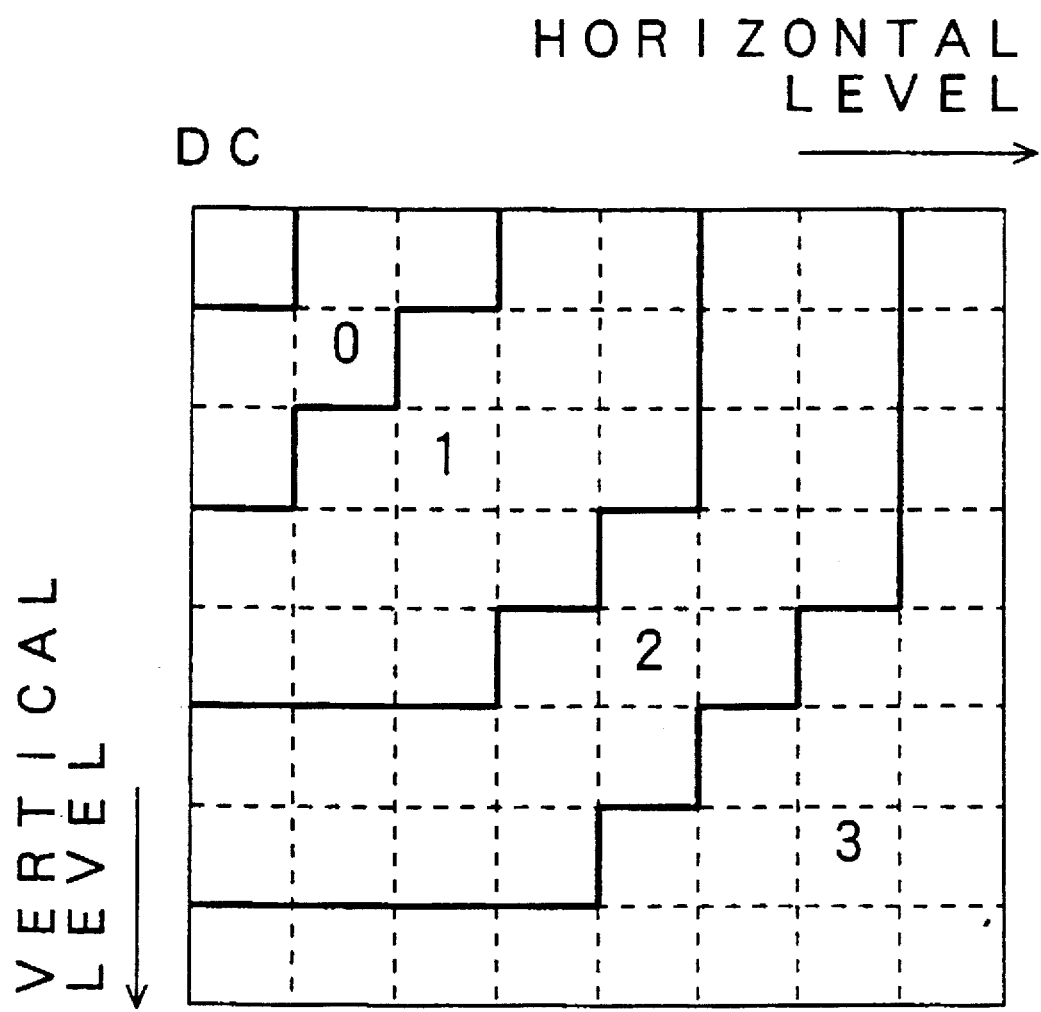
FIG. 12 is a view illustrating the relationship between a band area and quantization of those components in DVC which have been subjected to DCT.
Figure 13:
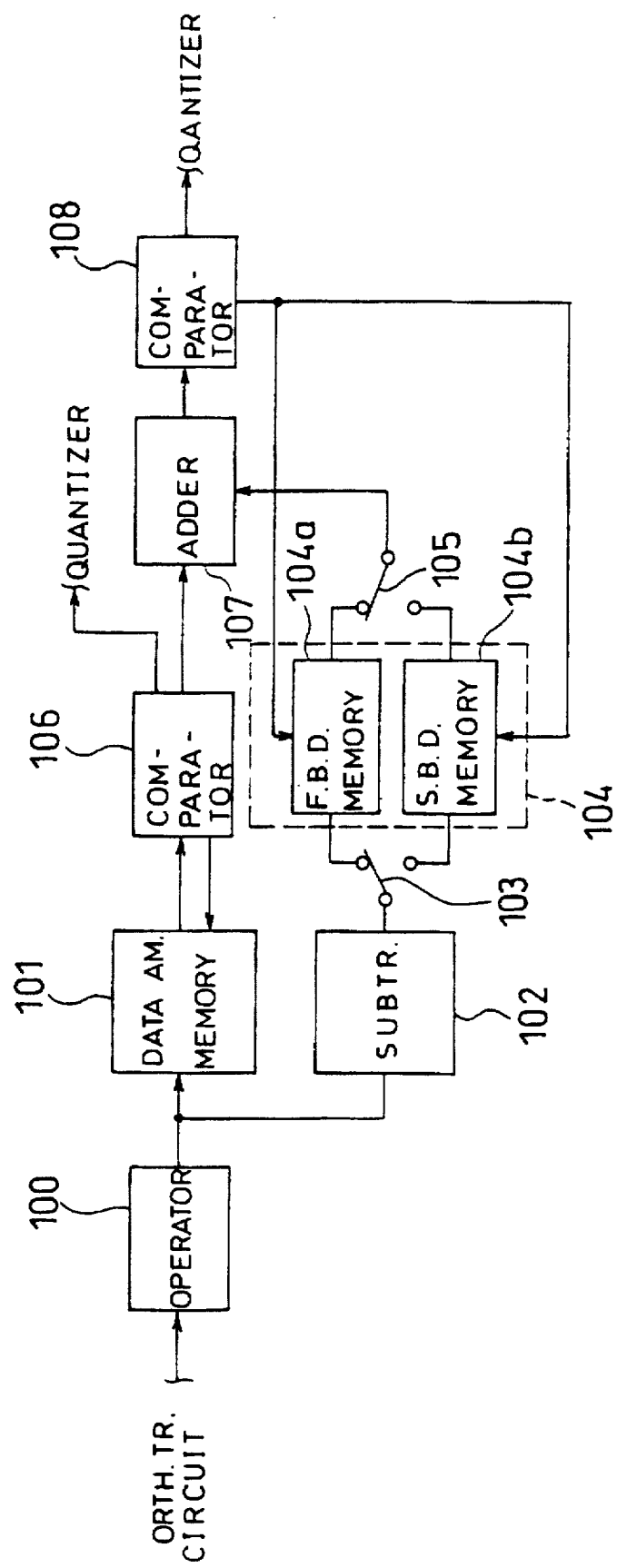
FIG. 13 is an electric circuit diagram of a quantization estimating circuit of an image data compressing apparatus disclosed in a conventional publication.

With reference to FIG. 10a, FIG. 10b and FIG. 11a, FIG. 11b, the following description will discuss a quantization level for a macro block to be used in this embodiment. According to this embodiment, the quality of an image can be improved with the use of that vacant portion of the fixed zone which is produced with each quantizer determined for each macro block slice. FIG. 10a and FIG. 10b show variations of the quantization level with the passage of time at the time when a data compression processing is executed. The period of time t0, t1, t2, . . . on the abscissa axis refers to a processing period of time for one macro block slice. FIG. 10a shows an example where there is used each quantizer having a common quantization level for each macro block slice. FIG. 10b shows an example where there is used each quantization level determined for each macro block according to this embodiment. FIG. 10b shows, by a broken line, variations of a quantization level with the passage of time when there is used a quantization level identical with that shown in FIG. 10a. As shown in FIG. 10b, data compression can be conducted, according to the embodiment, at a quantization level higher by one stage corresponding to some large blocks than the quantization level shown by the broken line.

Next, the quantization estimating method according to the present invention is compared with the conventional quantization estimating method of the feedfoward control type disclosed in the publication above-mentioned. According to the conventional estimating method, when determining each quantizer for each macro block, it is required that codelength cumulative addition calculations for a macro block slice are made and the results are stored in a memory, and that a difference between a quantizer Qn and a quantizer Qn−1 is calculated for one DCT or one macro block and the results are stored in a memory. It is therefore required to determine each quantization for each macro block with the use of two memories. This increases the number of operations. On the other hand, in a system using data compression such as an image processing or the like, a high-speed processing is particularly necessarily indispensable. Accordingly, when intended to process a huge amount of operations at a high speed, the circuit is increased in size and the power consumption is also increased. On the other hand, according to the method of the present embodiment, the results of cumulative operations first executed for each large block (macro block slice) are stored in the form of stairs, enabling the cumulative operation results to be utilized merely by changing/controlling the address.

In the following, the conventional quantization estimating method and the quantization estimating method of the present invention are compared with each other as to the number of operational processings for one macro block slice. It is supposed that the number of DCTs of one macro block slice is equal to L, the number of macro blocks of one macro block slice is equal to M, and the number of quantizers is equal to N. According to the conventional quantization estimating method, the number of additions is equal to (L−1)×N in the quantization calculation, the number of subtractions is equal to (L−1)×(N−1) in the difference calculation and the number of additions is equal to (L/M)×(N−1) in quantizer determination. On the other hand, according to the method of the present invention, the number of additions is equal to (L−1)×N in the quantization calculation, the number of subtractions is equal to (M−1) in quantizer determination and the number of additions is equal to (M1) in quantizer determination. According to the conventional method, the total number of additions and subtractions is equal to (L−1)×N+(L−1)×(N−1)+(L/M)×(N−1) =(L−1)×(2N−1)+(L/M)×(N−1). According to the method of the present invention, the total number of additions and subtractions is equal to (L−1)×N+(M−1)×2. More specifically, when it is supposed that L is equal to 30, M is equal to 5, N is equal to 16, the total number of additions and subtractions is equal to 989 in the conventional method and 472 in the method of the present invention. Thus, the number of calculations in the method of the present invention can be reduced as much as 52%. When it is now supposed that the power consumption is simply proportional to the total number of additions and subtractions, the power consumption required for the quantizer determining method according to the present invention can be reduced by 52% as compared with that required for the conventional method.

On the other hand, the conventional quantization estimating method and the quantization estimating method of the present invention are compared with each other as to the circuit size. When it is supposed that the number of DCTs of one macro block slice is equal to L, the number of macro blocks of one macro block slice is equal to M, and the number of quantizers is equal to N, the conventional circuit requires one memory of N words and one memory of (N−1)×L words. On the other hand, the circuit of the present invention requires only one memory of N×M words. More specifically, when it is supposed that L is equal to 30, M is equal to 5 and N is equal to 16, the conventional circuit requires a 16-word memory and a 450-word memory, but the circuit of the present invention requires only a 80-word memory. Further, the conventional circuit uses two memories. It is therefore required to dispose control circuits for the memories, respectively. The circuit of the present invention requires, as a matter of course, only one control circuit. More specifically, the quantization estimating circuit according to this embodiment requires no memory for storing differences. The SQ memory 14 for storing the results of cumulative addition calculations, can be used both for cumulative addition calculations and for quantizer determination. This remarkably reduces the circuit size and power consumption. When the number of memories is reduced from 2 to 1, it is advantageous in that the floor plan can readily be determined and the layout area can be reduced in designing the layout for integration.

Thus, the circuit according to the present invention is characterized in that both circuit size and power consumption can considerably be reduced. Further, the circuit of the present invention can comply with the standards for image processing such as DVC and the like, and is therefore widely applied to a variety of fields.

The quantization estimating circuit which embodies the quantization estimating method of the present invention, should not be limited to the arrangement shown in FIG. 7. The follOwing description will discuss another examples.

Figure 8:
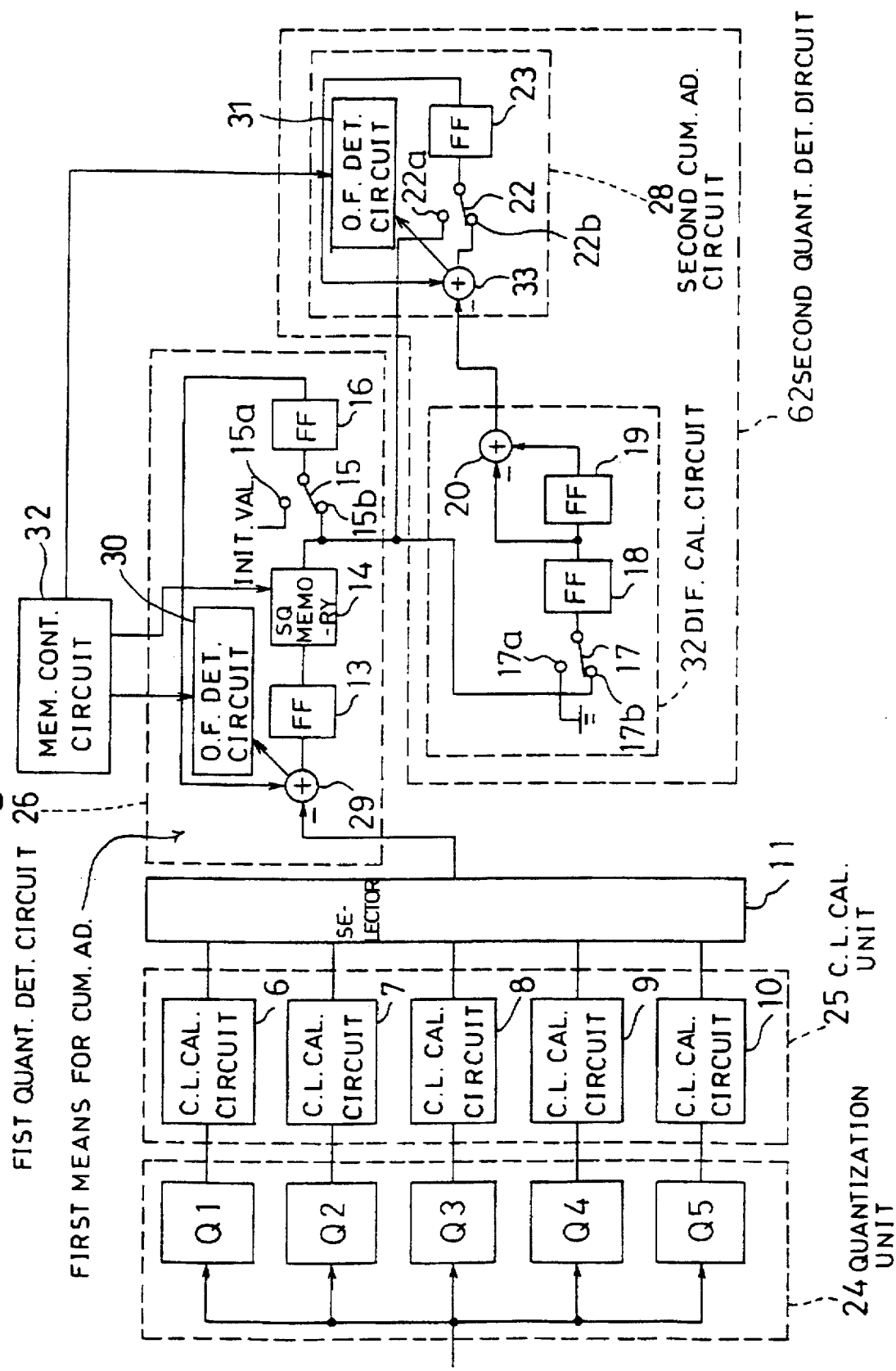
FIG. 8 is an electric circuit diagram of another example of the quantization estimating circuit as arranged to execute a cumulative operation with the use of a subtracter.

FIG. 8 shows the arrangement of another example of the quantization estimating circuit 72. The basic arrangement of the quantization estimating circuit 72 shown in FIG. 8 is similar to that shown in FIG. 7. In the example in FIG. 8, instead of the adder 12 in the first quantizer determining circuit 26, a subtracter 29 is disposed and a first overflow detecting circuit 30 is arranged to detect a borrow from the subtracter 29. In a second cumulative operation circuit 28 in FIG. 8, a subtracter 33 is disposed instead of the adder 21 shown in FIG. 7 and a second overflow detecting circuit 31 detects a borrow from the subtracter 33. Other arrangement than the foregoing, is the same as that shown in FIG. 7. Provision is made such that, as the contents of a SQ memory 14 after cumulative subtraction calculations have been made, the results of cumulative subtraction are stored in the form of N stairs per each of quantizers Q1 to Q5.

Figure 9:
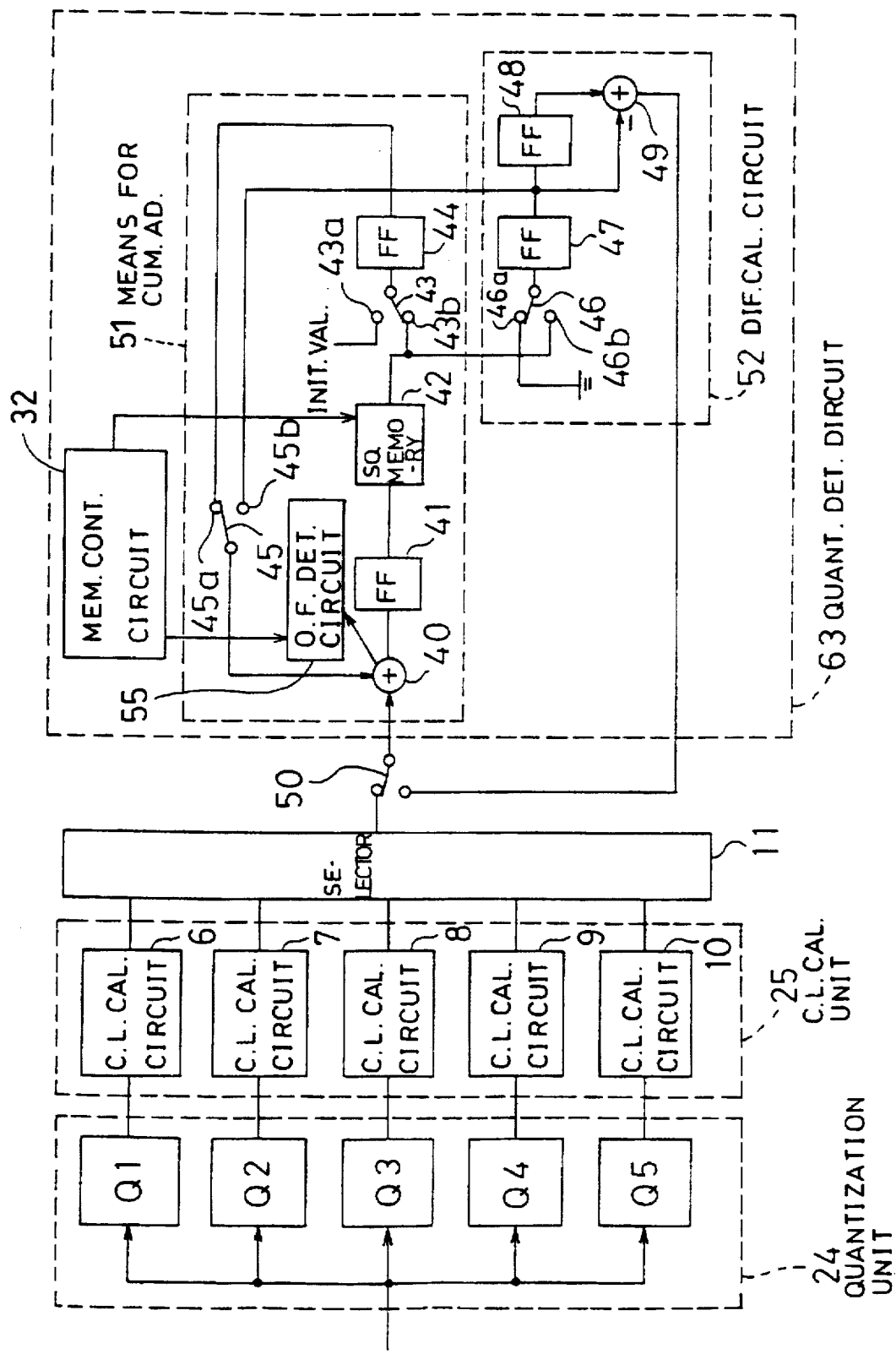
FIG. 9 is an electric circuit diagram of a further example of the quantization estimating circuit in which a single quantizer determining circuit incorporates a first quantizer determining circuit and a second quantizer determining circuit.

FIG. 9 shows a further example of the quantization estimating circuit. In the arrangement shown in FIG. 9, a cumulative operation circuit 51 has the functions achieved by the first cumulative addition circuit and the second cumulative addition circuit 28 shown in FIG. 7.

In FIG. 9, a quantizer determining circuit 63 serves as a first and second quantizer determining circuit. Disposed in the cumulative operation circuit 51 are an adder 40 for making cumulative addition calculations, a flip-flop 41, a SQ memory 42, a switch 43, a flip-flop 44 and a switch 45. The adder 40 achieves both the functions of the adders 12, 21 shown in FIG. 7. The switch 43 achieves both the functions of the switch 15 and the switch 22 shown in FIG. 7. The flip-flop 44 achieves both the functions of the flip-flop 16 and the flip-flop 23 in FIG. 7. In other words, two adders or the like are made in the form of a single adder or the like in the arrangement in FIG. 9

Disposed in a difference calculating circuit 52 are flip-flops 47, 48 and a subtracter 49. There is also disposed a switch 50 arranged to alternately connect, to the input terminal of the adder 40, the output side of the selector 11 and the output side of the difference calculating circuit 52 of the quantizer determining circuit 63. An overflow detecting circuit 55 is arranged to detect a carry from the adder 40 at the time when a cumulative operation is executed for determining each quantizer for each large block and at the time when a cumulative operation is executed for determining each quantizer for each small block.

In the quantization estimating circuit shown in FIG. 9, the single quantizer determining circuit 63 serves not only as a first quantizer determining circuit but also as a second quantizer determining circuit. Thus, the arrangement in FIG. 9 is advantageous in view of further reduction in circuit size as compared with the arrangement shown in FIG. 7.

It is a matter of course that similar effects may be produced even though the adder 40 is replaced with a subtracter in the arrangement in FIG. 9.

In the embodiment above-mentioned, the quantization estimating method is applied to a DVC data compressing. apparatus. However, the present invention should not be limited to such an embodiment. More specifically, in a system where a code length is generally estimated based on the feedforward control, the present invention can generally widely be applied in order to further improve the data quality with the effective use of that vacant portion of the fixed zone which is produced at the time when each quantizer is determined for each large block. Further, there are instances where the quantization level is changed in two stages instead of one stage. Even in such a case, the present invention can also be applied when executing a cumulative operation with each quantization level for each small block raised by two stages after each quantization has been determined for each large block. In such a case, by successively making calculations such as A34+A50−A30, A34+A51−A31, . . . in the quantizer determination processing as shown in FIG. 6 for example, there can readily be obtained the results of cumulative operations at the time when each quantizer used for each small block is replaced with the quantizer having a quantization level higher by two stages.

I claim:

1. A quantization estimating method for data compression in which there are used M quantizers disposed in order of quantization level qi (i=1−M) with the quantizer having the lowest quantization level ql at which quantization is accomplished most coarsely disposed first, a plurality of data to be encoded are divided into small blocks and large blocks each comprising N small blocks, and each quantizer is determined and selected for each small block, said quantization estimating method comprising:
   a first step of calculating each code length for each small block j (j=0 to N−1) per quantizer i (i=1 to M);
   a second step of (i) executing, per quantizer i, cumulative operations of said code lengths respectively obtained for said small blocks j at said first step, said cumulative operations being successively executed in order of quantization level with the quantizer having the lowest quantization level first, (ii) executing an operation of total code length for the large block while storing, per small block j, the results of said cumulative operations of code length, as the intermediate results A (i, 0) to A (i, N−2) and final results A (i, N−1), said results being stored in the form of N stairs, and (iii) determining each quantizer to be commonly used for each large block within the range where no overflow takes place; and
   a third step of (i) executing, with the use of said cumulative operation results stored in the form of stairs, an operation of total code length at the time when the quantizer determined for each small block j at said second step is replaced with a quantizer having a higher quantization level at which quantization is accomplished more finely, and (ii) determining, for each small block, a largest number of quantizers which can be replaced within the range where no overflow takes place.

2. A quantization estimating method for data compression according to claim 1, wherein at said second step, while holding the No. qi of a quantizer in which an overflow has taken place during the operation of total code length for said large block, there is determined, as a quantizer which can commonly be used for said large block, a quantizer qi−1 of which quantization level is lower by one stage than that of said quantizer qi.

3. A quantization estimating method for data compression according to claim 2, wherein:
   at said third step, (i) there are successively executed operations of a difference A (qi, j)−A (qi−1, j ) between the cumulative operation result A (qi, j) up to a small block j at the time when there is used a quantizer i where an overflow has taken place, and the cumulative operation result A (qi−1, j) up to said small block j at the time when there is used a marginal quantizer qi−1 where no overflow takes place, (ii) there is executed, based on the sum of said difference A (qi, j)−A (qi−1, j) and the final cumulative operation result A (qi−1, N−1) for said marginal quantizer qi−1 where no overflow takes place, an operation of total code length at the time when the quantization level of said quantizer qi−1 for each small block j is replaced with a one-stage higher quantization level, (iii) there is held a small block mj where an overflow takes place for the first time, and (iv) there is determined a marginal small block mj−1 where no overflow takes place; and at said fourth step, said quantizer qi is selected for small blocks m0 to mj−1 and said quantizer qi−1 is selected for small blocks mj to mn−1.

4. A quantization estimating method for data compression according to claim 1, wherein said cumulative operations at said second step are executed either by addition or by subtraction.

5. A quantization estimating method for data compression according to claim 1, wherein
   at the time of said cumulative operations at said second step, address control is executed such that a read address of said memory is delayed by a period of time corresponding to one DCT period when the small block changes with respect to a write address when storing, per small block j, said intermediate results A (i, 0) to A (i, N−2) and final results A (i, N−1) of said cumulative operations of code length, said results being stored in the form of N stairs.

6. A quantization estimating method for data compression according to claim 3, wherein said data compression is carried out for an image processing in a digital video cassette recorder formed based on a concept of macro blocks serving as said small blocks and macro block slices serving as said large blocks.

7. A quantization estimating circuit of a data compressing apparatus which is disposed in the data compressing apparatus, in which a plurality of data to be encoded are divided into small blocks and large blocks each comprising N small blocks, and which determines each quantization level for each small block, said quantization estimating circuit comprising:
   M quantizers disposed in order of quantization level qi (i=1−M) with the quantizer ql having the lowest quantization level at which quantization is accomplished most coarsely disposed first;
   code-length calculating circuits each connected to each quantizer i (i=1 to M) for making a calculation of code length for each small block j (j=0 to N−1) per quantizer i;
   a signal selecting circuit connected to each of said code-length calculating circuits for selecting and supplying one of signals of code lengths calculated by said code-length calculating circuits;
   a first quantizer determining circuit for receiving that signal of code length for a small block which has been selected by said signal selecting circuit and for determining a quantizer having the highest quantization level at which quantization is accomplished most finely which can commonly be used for the large block; and
   a second quantizer determining circuit for determining a small block for which there can be used a quantizer having a quantization level higher by one stage than said highest quantization level which can commonly be used for said large block and which has been determined by said first quantizer determining circuit;

said first quantizer determining circuit comprising:
   first cumulative operation means connected to said signal selecting circuit for (i) successively executing, per quantizer i, cumulative operations of said code lengths calculated for said small blocks j by said codelength calculating circuit, such cumulative operations being executed in order of quantization level with the quantizer having the lowest quantization level first, and (ii) making a calculation of total code length for said large block;

memory means for storing, per small block j, the operation results obtained by said first cumulative operation means as the intermediate results A (i, 0) to A (i, N−2) and final results A (i, N−1) of cumulative operations of code lengths, said results being stored in the form of N stairs, first overflow detecting means connected to said first cumulative operation means for detecting the time when said total code length for said large block overflows; and first holding means connected to said first overflow detecting means for holding the number qi of a quantizer where an overflow has taken place;

said second quantizer determining circuit comprising:

difference calculating means connected to said memory means and said first holding means for calculating a difference A (qi, j)−A (qi−1, j) between the cumulative operation result A (qi, j) up to a small block j for a quantizer qi where an overflow has taken place, and the cumulative operation result A (qi−1, j) up to said small block j for a marginal quantizer qi−1 where no overflow takes place;

second cumulative operation means connected to said difference calculating means for executing, based on the sum of said difference A (qi , j)−A (qi−1, j) and the final cumulative operation result A (qi−1, N−1) for said marginal quantizer qi−1 where no overflow takes place, an operation of total code length at the time when each quantization level for each small block j is replaced with a quantization level higher by one stage than the quantization level of said quantizer qi−1;

second overflow detecting means connected to said second cumulative operation means for detecting the time when the total code length operated by said second cumulative operation means overflows; and second holding means connected to said second overflow detecting means for holding the number qj of a small block for which an overflow has taken place.

8. A quantization estimating circuit of a data compressing apparatus according to claim 7, wherein said first quantizer determining circuit comprises: a first adder connected to said signal selecting circuit; a first flip-flop connected to said first adder; a memory called an SQ memory connected to said first flip-flop and serving as said memory means; an initial value setting device; a switch of which input side is alternately switched to said memory and said initial value setting device; a second flip-flop interposed between said switch in said quantizer determininq circuit and said first adder; and a first overflow detecting circuit connected to said first adder and serving as first overflow detecting means for detecting a carry in said first adder;

said first cumulative operation means is formed by said first adder, said first flip-flop, said initial value setting device, said switch in said quantizer determininq circuit and said second flip-flop;

said difference calculating means of said second quantizer determining circuit comprises: a switch connected to the ground and said SQ memory of said first quantizer determining circuit for alternately supplying a signal from said ground and a signal from said SQ memory; a third flip-flop connected to said switch in said quantizer determininq circuit; a fourth flip-flop connected to said third flip-flop; and a subtracter connected to said third and fourth flip-flops for calculating a difference in output between said third and fourth flip-flops;

said second cumulative operation means of said second quantizer determining circuit comprises: a second adder connected to said subtracter; a second switch connected to said SQ memory and said second adder for alternately supplying a signal from said SQ memory and a signal from said second adder; and a fifth flip-flop interposed between said second switch and said second adder; and said second overflow detecting means is connected to said second adder for detecting a carry from said second adder.

9. A quantization estimating circuit of a data compressing apparatus according to claim 8, wherein a single adder serves as said first adder and also as said second adder, a single switch serves as said first switch and also as said second switch, and a single flip-flop serves as said second flip-flop and also as said fifth flip-flop.

10. A quantization estimating circuit of a data compressing apparatus according to claim 7, wherein:

said first quantizer determining circuit comprises: a first subtracter connected to said signal selecting circuit; a first flip-flop connected to said first subtracter; a SQ memory connected to said first flip-flop and serving as said memory means; an initial value setting device; a switch of which input side is alternately switched to said memory and said initial value setting device; a second flip-flop interposed between said switch and said first subtracter; and a first overflow detecting circuit connected to said first subtracter and serving as first overflow detecting means for detecting a borrow from said first subtracter;

said first cumulative operation means is formed by said first subtracter, said first flip-flop, said initial value setting device, said switch in said quantizer determininq circuit and said second flip-flop;

said difference calculating means of said second quantizer determining circuit comprises: a switch connected to the ground and second SQ memory of said first quantizer determining circuit for alternately supplying a signal from said ground and a signal from said SQ memory; a third flip-flop connected to said switch in said quantizer determining circuit; a fourth flip-flop connected to said third flip-flop; and a second subtracter connected to said third and fourth flip-flops for calculating a difference in output between said third and fourth flip-flops;

said second cumulative operation means of said second quantizer determining circuit comprises: a third subtracter connected to said second subtracter; a second switch connected to said SQ memory and said third subtracter for alternately supplying a signal from said SQ memory and a signal from said third subtracter; and a fifth flip-flop interposed between said second switch and said third subtracter; and said second overflow detecting means is connected to said third subtracter for detecting a borrow from said third subtracter.

11. A quantization estimating circuit of a data compressing apparatus according to claim 10, wherein a single subtracter serves as said first subtracter and also as said third subtracter, a single switch serves as said first switch and also as said second switch, and a single flip-flop serves as said second flip-flop and also as said fifth flip-flop.

12. A quantization estimating circuit of a data compressing apparatus according to claim 7, wherein each of said first and second holding means is formed by a register, said registers being incorporated, together with said first and second overflow detecting means, in a single circuit.

13. A quantization estimating circuit of a data compressing apparatus according to claim 7, wherein said data compressing apparatus is used for an image processing apparatus of a digital video cassette recorder formed based on a concept of macro blocks serving as said small blocks and macro block slices serving as said large blocks.

14. A quantization estimating circuit of a data compressing apparatus according to claim 7, further comprising:

a memory control circuit connected to (i) said first overflow detecting means and said memory means of said first quantizer determining circuit, and (ii) said second overflow detecting means of said second quantizer determining circuit, said memory control circuit being arranged to control the address of said memory means, said memory control circuit being arranged such that, after a cumulative operation of code length up to a small block has been executed in an operation of total code length by said first cumulative operation means, a read address of said memory means is delayed by a period of time corresponding to one DCT period when the small block changes with respect to a write address.

15. A quantization estimating method for data compression in which there are used M quantizers disposed in order of quantization level qi (i=1–M) with the quantizer having the lowest quantization level ql at which quantization is accomplished most coarsely disposed first, a plurality of data to be encoded are divided into small blocks and large blocks each comprising N small blocks, and each quantizer is determined and selected for each small block, wherein when, with respect to small blocks composing a large block which are quantized at the same quantization level, the highest quantization level at which quantization is accomplished most finely is (qi–1) within the range where no overflow takes place so that a total code length of respective code lengths for said small blocks composing said large block exceeds the largest code length for said large block, the respective quantization levels for said small blocks are determined so as to satisfy either of the following conditions: that each of the quantization levels of said small blocks is (qi–1); or that each of said quantization levels for k (=1 to N–1) small blocks and each of the quantization levels for (N–k) small blocks is qx (qx>qi–1).

16. A quantization estimating method for data compression according to claim 15, wherein the quantization level qx is equal to qi which is higher than the quantization level (qi–1) by one stage.

17. A quantization estimating method for data compression in which there are used M quantizers disposed in order of quantization level qi (i=1–M) with the quantizer having the lowest quantization level ql at which quantization is accomplished most coarsely disposed first, a plurality of data to be encoded are divided into small blocks and large blocks each comprising N small blocks, and each quantizer is determined and selected for each small block, said quantization estimating method comprising:

a first step of calculating respective code lengths for small blocks j(=0 to N–1) per quantizer i;

a second step of determining, with respect to small blocks composing a large block which are quantized at the same quantization level, the highest quantization level at which quantization is accomplished most finely within the range where no overflow takes place so that a total code length of said respective code lengths of said small blocks j composing said large block exceeds the largest code length for said large block; and a third step of determining, within the range where no overflow takes place, the largest number of small blocks each allowing its quantization level (qi–1) to be replaced by a higher quantization level qx (qx>qi–1) at which quantization is accomplished more finely.

18. A quantization estimating method according to claim 17, wherein said higher quantization level qx is equal to qi which is higher than said quantization level (qi–1) by one stage.

* * * * *

UNITED STATES PATENT AND TRADEMARK OFFICE
CERTIFICATE OF CORRECTION

PATENT NO. : 5,724,452
DATED : March 3, 1998
INVENTOR(S) : Kazutake Ohara

It is certified that error appears in the above-identified patent and that said Letters Patent is hereby corrected as shown below:

Title page, item [54] and col. 1, line 2, after "Compression", insert-- and --

Col. 19, line 57, delete determininq" and insert --determining--
Col. 19, line 63, delete "determininq" and insert --determining--
Col. 20, line 4, delete "determininq" and insert --determining--
Col. 20, line 42, delete "determininq" and insert --determining--

Signed and Sealed this

Twenty-second Day of September, 1998

Attest:

BRUCE LEHMAN

Attesting Officer

Commissioner of Patents and Trademarks